United States Patent [19]

Fukuzaki et al.

[11] 4,002,700

[45] Jan. 11, 1977

[54] PROCESS FOR PREPARING A LIQUID RESINOUS COMPOSITION AND THE COMPOSITION

[75] Inventors: Hiroshi Fukuzaki; Masao Niki; Yukinaga Yokota; Jun-ichi Furukawa, all of Wakayama, Japan

[73] Assignee: Kao Soap Co., Ltd., Tokyo, Japan

[22] Filed: Nov. 10, 1975

[21] Appl. No.: 630,136

[30] Foreign Application Priority Data

Nov. 15, 1974 Japan .......................... 49-131662

[52] U.S. Cl. .............................. 260/872; 260/75 T; 260/75 UA; 260/861
[51] Int. Cl.$^2$ ................... C08L 67/06; C08G 63/76
[58] Field of Search ............... 260/872, 861, 75 T, 260/75 UA

[56] References Cited

UNITED STATES PATENTS 3,502,602    3/1970    Helm et al. .................... 260/861 X Primary Examiner—Lucille M. Phynes
Attorney, Agent, or Firm—Woodhams Blanchard and Flynn

[57] ABSTRACT

A liquid resinous composition is prepared by reacting a dibasic acid component containing $\alpha,\beta$-unsaturated basic acid with a glycol component to form an unsaturated polyester having an acid value of at least 10 and a molecular weight of 1,000 to 10,000, mixing the polyester with a basic substance to neutralize unreacted carboxyl groups and then subjecting the resulting water solubilized unsaturated polyester to addition reaction with a monovinyl compound. The composition is suited for adhesive, coating, printing ink, and binder.

9 Claims, No Drawings

PROCESS FOR PREPARING A LIQUID RESINOUS COMPOSITION AND THE COMPOSITION

BACKGROUND OF THE INVENTION

1. FIELD OF INVENTION

The present invention relates to a process for the preparation of liquid resinous compositions, and it is a primary object of the present invention to provide an aqueous resinous composition which can be used for various purposes, for example, as a film-forming composition for adhesives, coatings, printing inks, a binder and the like.

2. DESCRIPTION OF PRIOR ARTS

On the background of recently increasing social concerns on problems of evironmental pollutions and saving of petroleum resources, as is well known in the art, various efforts and attempts have been made to provide solvent-free compositions that can be used instead of film-forming compositions containing large quantities of organic solvents, which have heretofore been used in fields of adhesives, paints printing inks, paper- and fiber-finishing agents and the like. Among some expected solvent-free technological systems, water-based compositions may provide the most immediately feasible means and be applied with minimum modification of present equipment. Synthetic resin emulsions obtained by emulsion polymerization or aqueous resin solutions formed by dissolving water- or alkali-soluble resins in water or aqueous alkaline solution have heretofore been used as aqueous film-forming components and binders. Resin films or coating formed from such aqueous compositions, however, are generally defective in that the water resistance is poor and the drying property is inferior. Further, even if it is intended to crosslink and cure the film obtained from such aqueous compositions, the water-soluble curing agents having a good curing property at low temperatures is much limited and it is difficult to obtain cured films having a good water resistance. Accordingly, at the present, replacement of organic solvent based compositions by aqueous compositions involves various difficulties and cannot be accomplished with ease.

SUMMARY OF INVENTION

We made strenuous research works on such background, and we have found a process for the preparation of aqueous resinous compositions excellent in properties of resulting films, the water resistance and the curing property and have now completed the present invention.

More specifically, in accordance with the present invention, there is provided a process for the preparation of liquid resinous compositions characterized by reacting a dibasic acid component containing at least one $\alpha,\beta$-unsaturated basic acid with a glycol component to form an unsaturated polyester having an acid value of at least 10 and a molecular weight ranging from 1,000 to 10,000, mixing the so formed unsaturated polyester with water containing a basic component or a water-lower alcohol mixture containing a basic component to neutralize unreacted carboxyl groups in the unsaturated polyester by salt-forming reaction, and then subjecting the resulting water-solubilized unsaturated polyester composition to addition reaction with at least one monovinyl compound selected from the group consisting of (I) acrylic acid, methacrylic acid and alkali metal and ammonium salts thereof, (II) hydroxyalkyl ($C_1 - C_3$) esters of acrylic acid, amino-alkyl ($C_1 - C_3$) esters of acrylic acid, hydroxyalkyl ($C_1 - C_3$) esters of methacrylic acid and aminoalkyl ($C_1 - C_3$) esters of methacrylic acid, (III) acrylamide, methacrylamide and vinyl pyrrolidone, (IV) N-methylolated compounds of acrylamide, alkyl ($C_1 - C_3$) etherified N-methylolated compounds of acrylamide, N-methylolated compounds of methacrylamide and alkyl ($C_1 - C_3$) etherified N-methylolated compounds of methacrylamide, and (V) methyl acrylate, ethyl acrylate, methyl methacrylate and ethyl methacrylate, the amount of said monovinyl compound being within a range of $0.1 > M_2/M_1 > 5$ in which $M_1$ indicates the mole number of the unsaturated dibasic acid contained in the polyester and $M_2$ denotes the mole number of the monovinyl compound to be added.

The unsaturated polyester to be used in the present invention has a molecular weight of 1,000 to 10,000 and it is a so-called oligomer. It is necessary that the acid value of the unsaturated polyester should be at least 10. Unsaturated polyesters having such properties are readily water-solubilized or rendered emulsifiable or dispersible in water by a basic component.

Unsaturated dibasic acids customarily used for formation of ordinary unsaturated polyester, such as maleic acid, maleic anhydride, fumaric acid and itaconic acid, are used as $\alpha,\beta$-unsaturated dibasic acids for preparing such unsaturated polyester to be used in the present invention. A part of such $\alpha,\beta$-unsaturated dibasic acid may be substituted by a saturated dibasic acid such as phthalic acid, succinic acid and adipic acid, but substitution generally makes it difficult to render resinous compositions water-soluble or water-emulsifiable or water-dispersible. Accordingly, it is preferred that the amount of the saturated dibasic acid be up to 30 mole % of the total dibasic acid component.

As the glycol component to be used for formation of the above-mentioned unsaturated polyester, there can be used, for example, polyethylene glycol having an average molecular weight of 200 to 4,000, polypropylene glycol having an average molecular weight of 200 to 4,000 an adduct of 5 to 200 moles of an alkylene oxide to castor oil, an adduct of 5 to 200 moles of an alkylene oxide to hardened castor oil and as a part or whole of the glycol component. By use of such glycol, a polyester that can readily be water-solubilized can be obtained. Further, hydrogenated bisphenol A and an alkylene oxide adduct of bisphenol A are effectively used as the glycol component because they impart a preferred hardness to the resulting polyester.

Polyesters of a low degree of polymerization formed by reacting a low-molecular-weight alkylene glycol such as diethylene glycol, triethylene glycol, tetraethylene glycol or the like with maleic acid or maleic anhydride can easily be rendered water-soluble in the presence of a basic substance. Polyhydric alcohols having at least 3 hydroxyl groups such as glycerin, trimethylol propane and pentaerythritol or alkylene oxide adducts of these polyhydric alcohols tend to lower drastically the flowability of resulting water-dissolved or water-dispersed polyester compositions or to cause an undesired phenomenon of precipitation of insoluble substances. Accordingly, they are not suitable as the starting material.

In the polyester-forming reaction of the present invention, the dibasic acid component and glycol component are used in equimolar amounts or in such amounts that the degree of excess of one component is not higher than 50 mole % of the other component, and the polyester-forming reaction is conducted so that the conversion is at least 75%. It is important that the resulting unsaturated polyester should have suitable quantities of unreacted carboxyl groups, and this content of unreacted carboxylic groups can be expressed as an acid value of at least 10, preferably at least 15. Polyesters having such acid value can readily be water-solubilized by a basic substance.

Small amounts of a gelation-preventing agent, a stabilizer and other additive may be added to the dibasic acid and glycol components according to need, and the polyester-forming condensation reaction is carried out at 150° to 210° C., preferably 190° to 200° C., under a nitrogen gas current or under reduced pressure until the prescribed acid value is attained.

The so obtained unsaturated polyester is formed into an aqueous composition (A) in the following manner.

The unsaturated polyester is agitated in warm water containing a basic component in an amount equimolar to the acid value of the unsaturated polyester or in a slightly excessive amount and being maintained at a temperature higher than the softening point of the unsaturated polyester resin, until a homogeneous system is formed, whereby an aqueous polyester composition (A) is obtained.

As the basic component that is used in the present invention, there can be mentioned, for example, sodium hydroxide, potassium hydroxide, ammonia, morpholine, diethyl amine, triethyl amine, monoethanol amine, diethanol amine, triethanol amine, isopropanol amine, di-isopropanol amine, tri-isopropanol amine and the like. Use of a tertiary amine is preferred because it is stable to hydrolysis of the polyester and it has lower smell or is hardly discolored. When alkanol amines are used, the polyester is readily rendered water-soluble and the resulting composition has a good storability. Such basic component is used in the form of an aqueous solution or a solution in a mixture of water and a lower alcohol such as methanol, ethanol, propanol or the like.

The water-solubilized unsaturated polyester composition (A) obtained by the neutralization is still insufficient when it is directly used for various purposes as a film-forming composition and a binder. For example, the resulting film lacks toughness and it exhibits some stickiness or flowability at temperatures ranging from room temperature to 50° C. Further, in some case, the water resistance of the resulting film is poor.

According to the present invention, a functional monovinyl compound is added to such unsaturated polyester composition (A) of a low degree of polymerization, whereby the physical and chemical properties of the unsaturated polyester can be converted to those much desired for a film-forming component and such functional characteristics as adhesiveness, dispersibility and self-crosslinking property can be introduced, and an aqueous liquid resinous composition (B) that can be used for various purposes can be provided.

None of excellent properties possessed by the liquid resinous composition of the present invention can be attained in a mixture of a polymer of the mentioned monovinyl compound and the aqueous polyester composition (A). Further, the present invention is quite irrelevant to the concept of polymerization and cross-linking of an unsaturated polyester composition with a monovinyl compound. The liquid resinous composition (B) of the present invention is valuable as an aqueous film-forming agent or binder, and it takes a liquid form having a flowability. In the present invention, the monovinyl compound should not be such as will cause crosslinking or gelation in unsaturated polyesters.

The monovinyl compound to be used in the present invention is selected from the group consisting of compounds (I) (II), (III), (IV) and (V). These monovinyl compounds may be used singly or in the form of a mixture of two or more of them. The monovinyl compound is added to the unsaturated polyester in an amount of $0.1 > M_2/M_1 > 5$ in which $M_1$ indicates the mole number of the unsaturated dibasic acid contained in the polyester and $M_2$ denotes the mole number of the monovinyl compound to be added.

When the monovinyl compound is used in an excessive amount over the above range, undesired phenomena such as formation of gels are caused and it is impossible to obtain the intended resinous composition having a flowability. Accordingly, it is not preferred to use the monovinyl compound in such excessive amount.

The effects of the present invention, namely the above-mentioned excellent characteristics, can be attained by incorporation of a small quantity of a chemically functional group. In the present invention, it is deemed generally sufficient to add one molecule of the monovinyl compound to one molecule of the polyester.

In general, the addition reaction is accomplished by incorporating the monovinyl compound as it is or in the form of an aqueous solution or lower alcohol solution into the water-solubilized unsaturated polyester composition (A) under agitation in a nitrogen gas current and heating the mixture at 50° to 90° C. in the presence of a catalyst. As the catalyst to be used in the present invention, there can be mentioned, for example, persulfates such as ammonium persulfate and potassium persulfate, hydrogen peroxide, peracetic acid and so-called redox catalysts comprising a peroxide catalyst such as mentioned above and a reducing agent such as a sulfite, a ferrous salt or the like.

Various effects can be attained by addition of the monovinyl compound, and the resulting composition can be used as a versatile composition. Common effects are those of improving the film-forming property of the composition, improving the water resistance in the resulting film and accelerating the curing reaction in combination with a curing agent (crosslinking agent such as amino resins). When the liquid resinous composition (B) of the present invention is used as a film-forming agent, a binder or the like, these effects provide good results in connection with toughness of the film, the water resistance, the heat resistance, the anti-blocking property, the curability and other various characteristics. Further, by introduction of special chemically functional groups, peculiar properties can be imparted to the polyester. For example, when acrylamide, vinyl pyrrolidone or the like is added, there can be obtained a polyester bearing hydrogen-bonding characterstics, and when N-methylol acryamide is added, the self-linking property inherent of the methylol group is introduced into the polyester.

In a polyester composition in which ammonium acrylate or 2-hydroxyethyl acrylate has been added, excellent adhesiveness and pigment dispersibility can be attained. Accordingly, the polyester composition of this type can be advantageously used as a vehicle for paints and the like.

Effects attained by the present invention will now be illustrated by reference to the following Examples, in which all of "parts" are by weight.

EXAMPLE 1

1050 Parts (3.0 moles) of an adduct of 2.0 moles of propylene oxide to bisphenol A, 323 parts (2.8 moles) of fumaric acid and 343 parts (0.23 mole) of polyethylene glycol having an average molecular weight of 1,500 were heated and reacted at 160° to 210° C. in a nitrogen gas current to obtain an unsaturated polyester having an acid value of 22 and an average molecular weight of 1,800. Then, 300 parts of the so obtained unsaturated polyester was dissolved under heating to about 60° C. and under agitation into 700 parts of an aqueous solution containing 4.8 parts of sodium hydroxide to obtain an aqueous polyester composition (I-a) of a 30% concentration which was lightly yellow and transparent. A reaction vessel equipped with an agitator, a thermometer, a nitrogen gas-introducing pipe and a reflux condenser was charged with 100 parts of the composition (I-a), 2.0 parts of a 50% methanol solution of 2-hydroxyethyl methacrylate and 1.0 part of a 10% aqueous solution of ammonium persulfate as a catalyst for addition reaction, and the mixture was heated at 70° C. under agitation in a nitrogen gas current. After 2 hours, the reaction mixture was cooled to obtain a modified polyester resin composition (II-a).

Each of the polyester composition (I-a) and the liquid resinous composition (II-a) was cast on a release paper and dried in air to form film having a thickness of 0.6 to 0.8 mm. The film was aged overnight under constant conditions of 25° C. and a relative humidity of 65%, and the tensile strength and elongation of the film were measured by a Tensilon tensile tester according to the method of JIS K-6301. The film formed from the unsaturated polyester composition (I-a) was a highly sticky soft resin and it flowed in a leggy state under application of a tensile stress of about 100 g/cm². In contrast, the film formed from the liquid resinous composition (II-a) was an elastic film characterized by a tensile strength of 2.5 Kg/cm² and an elongation at break of 700%. These films were finely cut and subjected to an extraction test with water for 24 hours by using a Soxhlet extractor. The film prepared from the unsaturated polyester composition (I-a) was completely dissolved out, but the film prepared from the liquid resinous composition (II-a) retained the original form and more than 90% of its original weight.

EXAMPLE 2

53 Parts (0.5 mole) of diethylene glycol, 172 parts (0.5 mole) of an adduct of 2.0 moles of propylene oxide to bisphenol A, 116 parts (1.0 mole) of fumaric acid and 85 parts (0.085 mole) of polyethylene glycol having an average molecular weight of 1,000 were heated and reacted to obtain an unsaturated polyester having an acid value of 23 and an average molecular weight of 1,700. 300 Parts of the so obtained unsaturated polyester resin was dissolved in 700 parts of an aqueous solution containing 12 parts of dimethyl amine to form an unsaturated polyester composition (I-b). Then, 100 parts of a methanol solution containing 12 parts (0.17 mole) of acrylamide was added to the unsaturated polyester composition (I-b), and small quantities of ammonium persulfate and sodium sulfite were added to the mixture and reaction was conducted at 50° C. under agitation in a nitrogen gas current for 1 hour to obtain a liquid resinous composition (II-b). 100 Parts each of the compositions (I-b) and (II-b) were mixed with 5 parts of a 50% aqueous solution of tri-N-methylol melamine and 5 parts of a 10% aqueous solution of ammonium p-toluenesulfonate, and each of the resulting mixtures was coated and air-dried on a release paper. The resulting films were cured at 70° C. for 3 hours. In the case of the film prepared from the composition (I-b), the stickiness remained even after the heat treatment and no sufficient curing could attained. In contrast, the film prepared from the composition (II-b) was tough and free of the blocking property after the heat treatment and it was found that the film prepared from the composition (II-b) was excellent in the curing property.

EXAMPLE 3

77 Parts (0.326 mole) of hydrogenated bisphenol A, 394 parts (1.12 moles) of an adduct of 2.0 moles of propylene oxide to bisphenol A, 168 parts (1.45 moles) of fumaric acid and 150 parts (0.1 mole) of polyethylene glycol having an average molecular weight of 1,500 were reacted to obtain an unsaturated polyester having an acid value of 18 and an average molecular weight of 3,000. Then, 700 parts of the so obtained unsaturated polyester was dissolved in 1,800 parts of an aqueous solution containing 50 parts of tri-isopropanol amine to form an aqueous unsaturated polyester composition (I-c). According to the recipe described in Example 2, this composition was modified with one member selected from ammonium acrylate, 2-hydroxyethyl methacrylate, vinyl pyrrolidone, N-methylol acrylamine and methyl acrylate to form an aqueous liquid polyester resin composition (II-c). The properties of the film, the adhesiveness and dispersibility were examined to obtain results shown in Table 1.

The properties of the film were determined according to the method described in Example 1. The adhesiveness was evaluated based on the following scale:

A: good adhesiveness to each of kraft paper, aluminum foil and polypropylene film B: good adhesiveness to kraft paper and aluminum foil C: good adhesiveness to kraft paper alone As regards the dispersibility, the composition (I-c) or (II-c) was added in an amount of 0.5% by weight to aqueous suspension containing 1% by weight of titanium white (TiO$_2$, Rutile Type 820), and the rate of sedimentation was compared in the measuring cylinders of same size and the dispersibility was evaluated in an order of A, B and C.

Table 1

| | Kinds and Effects of Monovinyl Compounds | | | | | | |
|---|---|---|---|---|---|---|---|
| | Monovinyl Compound | | Properties of Film | | | | |
| Run No. | Kind | Amount Added (M$_2$/M$_1$) | Tensile Strength (Kg/cm²) | Elongation at break (%) | Water-extracted (wt.-%) | Adhesiveness | Dispersibility |
| control | unmodified (composition I-c) | 0 | below 0.1 | — | 100 | C | C |

Table 1-continued

Kinds and Effects of Monovinyl Compounds

| | Monovinyl Compound | | Properties of Film | | | | |
|---|---|---|---|---|---|---|---|
| Run No. | Kind | Amount Added ($M_2/M_1$) | Tensile Strength ($Kg/cm^2$) | Elongation at break (%) | Water-extracted (wt.-%) | Adhesiveness | Dispersibility |
| 1 | ammonium acrylate | 0.2 | 3.3 | 1200 | 18.5 | B | A |
| 2 | 2-hydroxyethyl methacrylate | 0.5 | 14.5 | 600 | 10.9 | A | B |
| 3 | vinylpyrrolidone | 0.2 | 22.7 | 200 | 8.5 | C | C |
| 4 | N-methylol acrylamide | 0.2 | 3.5 | 750 | 13.0 | B | B |
| 5 | methyl acrylate | 0.5 | 32.0 | 50 | 5.0 | C | C |

EXAMPLE 4

250 Parts (1.06 mole) of hydrogenated bisphenol A and 116 parts (1.0 mole) of maleic acid were heated and reacted to obtain an unsaturated polyester having an acid value of 42 and an average molecular weight of 1,430. Then, 300 parts of the so obtained unsaturated polyester was dissolved under heating in 700 parts of an aqueous solution containing 47 parts of tri-isopropanol amine, and 50 parts of an ethanol solution containing 9.8 parts (0.114 mole) of methyl acrylate was added to the solution. Then, reaction was conducted under agitation in a nitrogen gas current at 50° C. for 1 hour by using a small amount of a catalyst composed of 30% aqueous hydrogen peroxide and an aqueous solution of ferrous chloride, to form an aqueous liquid resinous composition. A film prepard from this resinous composition had a tensile strength of 36 Kg/cm² and was excellent in the water resistance.

EXAMPLE 5

76 Parts (1.0 mole) of propylene glycol, 104 parts (0.9 mole) of fumaric acid, 15 parts (0.1 mole) of phthalic anhydride and 39 parts (0.01 mole) of polyethylene glycol having an average molecular weight of 4,000 were reacted at 200° C to obtain an unsaturated polyester having an acid value of 43 and an average molecular weight of 1,500. Then, 100 parts of the so obtained unsaturated polyester was dissolved under heating in 300 parts of an aqueous solution containing 3.5 parts of dimethyl amine to form an aqueous unsaturated polyester composition. Then, a solution formed by dissolving 7.1 parts (0.1 mole) of acrylic acid in 13 parts of methanol and neutralizing it with a small quantity of aqueous ammonia was added to the above composition and addition reaction was carried out in the presence of a small amount of potassium persulfate as a catalyst. Then, 25 parts of calcium carbonate powder and 20 parts of titanium white were added to 100 parts of the so obtained aqueous liquid resinous composition, and they were blended in a ball mill for about 10 hours to obtain an water-based paint. Then, 5 parts of tri-N-methylol melamine as a curing agent was incorporated into the paint, and the paint composition was coated on a tinplate, air-dried and baked at 110° C. for about 30 minutes. The resulting coating was evaluated according to the paint test method of JIS K-5400. As a result, it was confirmed that the coating had an excellent adhesion to the substrate and a high water resistance.

Further modifications will occur to those skilled in this art, and all such are considered to fall within the spirit and scope of the invention as defined in the appended claims.

What is claimed is:

1. A process for the preparation of liquid resinous compositions characterized by reacting a dibasic acid component containing at least one $\alpha,\beta$-unsaturated basic acid with a glycol component to form an unsaturated polyester having an acid value of at least 10 and a molecular weight ranging from 1,000 to 10,000, mixing the so formed unsaturated polyester with water containing at least one basic component or a water-lower alcohol mixture containing at least one basic component to neutralize unreacted carboxyl groups in the unsaturated polyester by salt-forming reaction, and then subjecting the resulting water-solubilized unsaturated polyester composition to addition reaction with at least on monovinyl compound selected from the group consisting of (I) acrylic acid, methacrylic acid and alkali metal and ammonium salts thereof, (II) hydroxyalkyl ($C_1 - C_3$) esters of acrylic acid, aminoalkyl ($C_1 - C_3$) esters of acrylic acid, hydroxyalkyl ($C_1 - C_3$) esters of methacrylic acid and aminoalkyl ($C_1 - C_3$) esters of methacrylic acid, (III) acrylamide, methacrylamide and vinylpyrrolidone, (IV) N-methylolated compounds of acrylamide, alkyl ($C_1 - C_3$) etherified N-methylolated compounds of acrylamide, N-methylolated compounds of methacrylamide and alkyl ($C_1 - C_3$) etherified N-methylolated compounds of methacrylamide, and (V) methyl acrylate, ethyl acrylate, methyl methacrylate and ethyl methacrylate, the amount of said monovinyl compound being within a range of $0.1 < M_2/M_1 < 5$ in which $M_1$ indicates the mole number of the unsaturated dibasic acid contained in the polyester and $M_2$ denotes the mole number of the monovinyl compound to be added.

2. A process according to the process as claimed in claim 1, in which said $\alpha,\beta$-unsaturated basic acid is selected from a group consisting of maleic acid, maleic anhydride, fumaric acid and itaconic acid.

3. A process according to the process as claimed in claim 1, in which the basic acid component contains 30 mol percent or less of a saturated dibasic acid selected from a group consisting of phthalic acid, succinic acid and adipic acid.

4. A process according to the process as claimed in claim 1, in which said glycol component is selected from a group consisting of polyethylene glycol having an average molecular weight of 200 to 4,000, polypropylene glycol having an average molecular weight of 200 to 4,000, an adduct of 5 to 200 moles of an alkylene oxide to castor oil, an adduct of 5 to 200 moles of an alkylene oxide to hardened castor oil, hydrogenated bisphenol A, an alkylene oxide adduct of bisphenol A, diethylene glycol, triethylene glycol, and tetraethylene glycol.

5. A process according to the process as claimed in claim 1, in which said basic component is selected from a group consisting of sodium hydroxide, potassium hydroxide, ammonia, morpholine, diethyl amine, triethyl amine, monoethanol amine, diethanol amine, triethanol amine, isopropanol amine, diisopropanol amine and tri-isopropanol amine.

6. A process according to the process as claimed in claim 1, in which the unsaturated polyester is formed to have an acid value of at least 15.

7. A process according to the process as claimed in claim 1, in which said addition reaction is carried out at a temperature in the range between 50° and 90° C, in the presence of a catalyst selected from a group consisting of ammonium persulfate, potassium persulfate, hydrogen peroxide, peracetic acid.

8. A process according to the process as claimed in claim 7, in which said catalyst is a persulfate, hydrogen peroxide, peracetic acid, or a redox catalyst.

9. A liquid resinous composition prepared by a process as claimed in claim 1.

* * * * *